US 6,735,356 B2

(12) United States Patent
Britz et al.

(10) Patent No.: US 6,735,356 B2
(45) Date of Patent: May 11, 2004

(54) FREE SPACE DUPLEXED OPTICAL COMMUNICATION WITH TRANSMITTER END MULTIPLEXING AND RECEIVER AND AMPLIFICATION

(75) Inventors: David M. Britz, Rumson, NJ (US); Jeevan Prakash Dodley, Parsippany, NJ (US)

(73) Assignee: AT&T Corp., New York, NY (US)

( * ) Notice: Subject to any disclaimer, the term of this patent is extended or adjusted under 35 U.S.C. 154(b) by 291 days.

(21) Appl. No.: 09/849,342

(22) Filed: May 7, 2001

(65) Prior Publication Data

US 2003/0215176 A1 Nov. 20, 2003

(51) Int. Cl.[7] ............................. G02B 6/00; G02B 6/36

(52) U.S. Cl. ............................ 385/24; 372/6; 398/79
(58) Field of Search .......................... 385/24, 16, 147; 372/6, 21; 398/79

(56) References Cited

U.S. PATENT DOCUMENTS 6,144,679 A * 11/2000 Herman et al. ............... 372/21
6,233,077 B1 * 5/2001 Alexander et al. ............ 398/79

* cited by examiner

Primary Examiner—Akm Enayet Ullah

(57) ABSTRACT

A free space wavelength duplexed system includes a first and second terminals where each terminal includes a receiver part and a transmitter part, and the receiver includes a telescope, and optical-to-electrical converter, and an optical amplifier coupled between the telescope and the optical-to-electrical converter.

11 Claims, 5 Drawing Sheets

FREE SPACE DUPLEXED OPTICAL COMMUNICATION WITH TRANSMITTER END MULTIPLEXING AND RECEIVER AND AMPLIFICATION

BACKGROUND OF THE INVENTION

1. Field of the Invention

The present invention relates to a free space optical communication link, and in particular, the invention relates to techniques to spread error sources over time intervals and provide redundant channels to reduce the effects of fading.

2. Description of Related Art

Known optical communication systems rely on optical fibers between transmitter and receiver. However, to establish a system network require obtaining right of ways and installation of fiber, a time consuming and expensive process.

Free space optical communication systems are fundamentally different than fiber optic systems in that fiber is typically used to transport data between node points. Distances are more limited with free space due to atmospheric attenuation or man-made or natural obstacles. In particular, in free space, the media is air and subject to atmospheric disturbances such as fog, rain and resulting fades. Please refer to our earlier United States patent application with Robert Miller, U.S. Ser. No. 09/640,576 filed Aug. 17, 2000, entitled "Free Space Optical Communication Link with Diversity," to be deemed incorporated by reference as to its entire contents Koh and Davidson ("Interleaved Concatenated Coding For The Turbulent Atmospheric Direct Detection Optical Communication Channel", *IEEE Transactions On Communications*, Vol. 37, No. 6, June 1989, pages 648–651) discuss how the direct detection atmospheric optical communication channel is characterized by strong fading of the received laser light intensity caused by random variations in the index of refraction encountered by laser light variations as it propagates through the channel.

In addition, the Jet Propulsion Laboratory of the California Institute of Technology published in November of 1998 a Technical Support Package on Multiple-Beam Transmission For Optical Communication in November 1998 as NASA Tech Brief, Vol. 22, No. 11 from a JPL New Technology Report NPO-20384. This NASA Tech Brief describes how superposition of mutually incoherent beams would reduce deleterious effects of atmospheric turbulence.

SUMMARY OF THE INVENTION

It is an object to the present invention to provide a free space wavelength duplexed optical communication link that is reduces the effects of fading.

This and other objects are achieved in a free space wavelength duplexed system that includes first and second terminals. The first terminal includes an optical transmitter and an optical receiver. The optical transmitter provides multiplexing. The optical receiver has an optical system that functions similarly to a telescope for collecting light emitted by the corresponding transmitter, an optical to electrical converter and an optical amplifier coupled between the optical system and the optical to electrical converter.

In an alternative embodiment, a method includes the steps of receiving a received optical signal through a telescope, diverting the received optical signal in an optical splitter into an optical amplifier, and transmitting a transmit optical signal through the optical splitter to the telescope.

In another alternative embodiment, a method includes the steps of receiving plural received optical signals through a telescope, diverting the plural received optical signals in an optical splitter into an optical amplifier, separating the plural amplified optical signals by wavelength, and transmitting plural transmit optical signals at distinct wavelengths through the optical splitter to the telescope.

The receiver includes diversity reception means to optimally combine the received signals.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
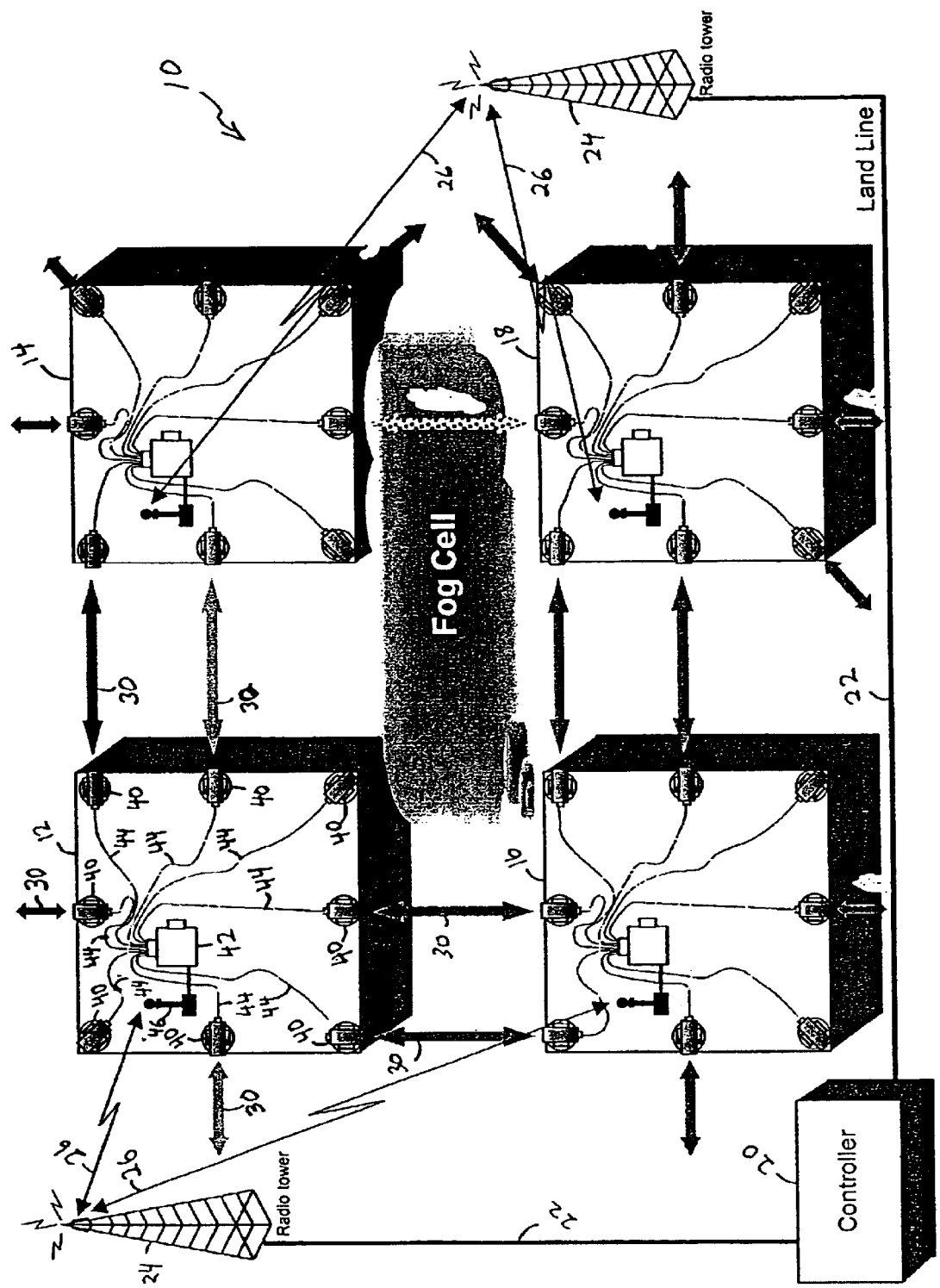
FIG. 1 is a schematic of an optical communication system incorporating the present invention.

In FIG. 1, communication system 10 includes a plurality of nodes, depicted as nodes 12, 14, 16 and 18, that may be located on the tops of tall buildings in metropolitan areas and on towers elsewhere. Each node is coupled to a network control system that includes central controller 20, land lines 22 and one or more radio towers 24. Radio towers 24 communicate with the nodes over wireless links 26. The control system may advantageously include a typical cellular telephone system, controller 20 (located at a convenient location) and cell phone transceiver 46 at each node to direct the operation of communication system 10.

The nodes are configured into a network by a plurality of point-to-point links of which link 30 is typical. Each link, as depicted by link 30, includes a bidirectional (e.g., duplex) free space optical channel. However, in any network, there may be one or more links with only a unidirectional channel.

Each node includes at least one outdoor unit 40 (hereinafter ODU), and typically a plurality of ODUs. For example, eight ODUs 40 are depicted in FIG. 1 on the top of a building at node 12. Each ODU is coupled to switch circuit 42 through respective cables 44. Each ODU couples free space optical signals received over link 30 into cable 44, and propagates optical signals in a fiber in cable 44 as free space optical signals over link 30. Switch circuit 42 is controlled by controller 20 through cell phone transceiver 46. Typically switch circuit 42 and cell phone transceiver 46 are part of an indoor unit (IDU).

The free space optical channel (hereinafter FSOC) can transmit at a super high bandwidth that no other wireless technology can offer. However, the FSOC is subject to transmission beam fades due to atmospheric turbulence. Some or all of the transmission beam fades can be reduced by use of delay and diversity techniques which include redundant transmission beams and wavelengths within the optical or electrical path through a free space optical communication system to overcome transmission errors due to atmospheric fade.

Figure 2:
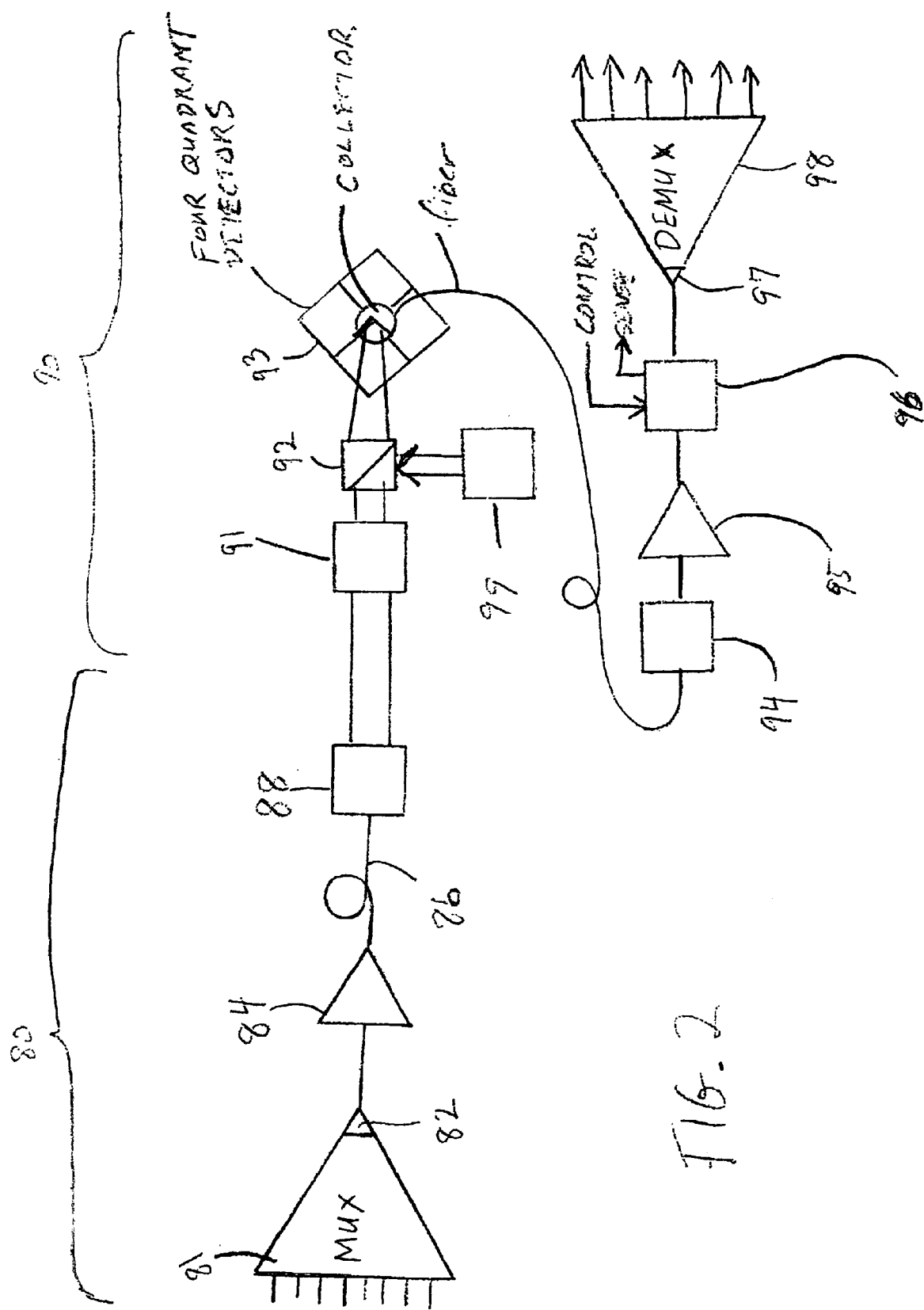
FIG. 2 is a block diagram of a first embodiment of the present invention.

In FIG. 2, a free space optical channel (as in link 30 of FIG. 1) includes transmitter 80 and receiver 90. Transmitter 80 includes electrical multiplexer 81 to drive laser transmitter 82 as input to optical amplifier 84 to couple an optical signal through fiber connection 86 to optical emitting telescope 88. Electrical multiplexer 81 accepts multiple independent data signals and combines them into a single signal to modulate laser transmitter 82. Laser transmitter 82 is preferably, but not necessarily, a properly driven laser diode. Optical amplifier 84 is preferably, but not necessarily, an erbium doped fiber amplifier (EDFA). Optical amplifier 84 receives the optical signal from laser transmitter 82 and provides an amplified optical signal at the desired power level to fiber connector 86. Fiber connector 86 is preferably, but not necessarily, a single mode optical fiber to deliver the amplified optical signal from optical amplifier 84 (usually part of the indoor unit) to optical emitting telescope 88 (usually part of the outdoor unit). Optical emitting telescope 88 propagates the optical signal through free space (the atmosphere) from a node that includes optical emitting telescope 88 to the node that includes optical (light collecting) telescope 91.

Receiver 90 includes optical telescope 91 coupled to optical duplexer 92. The optical signal that passes out of the receive port of optical duplexer 92 is captured by conical fiber collector 93. Preferably, conical fiber collector 93 is surrounded by four quadrant detectors (e.g., photo diodes) that are sensed electrically to adjust the point of optical telescope 91, if necessary; however, conical fiber collector 93 collects the optical signal for transmission in a fiber to optical filter 94. Optical filter 94 ensures that only the desired receive optical band is passed to optical amplifier 95; thereby eliminating any back scatter from optical transmitter 99. Optical amplifier 95 is preferably, but not necessarily, an erbium doped fiber amplifier (EDFA). The output of optical amplifier 95 is coupled through optical attenuator 96 to optical detector 97 (e.g., a photo diode). Optical attenuator 96 senses the optical power level and receives a command to adjust the amount of attenuation to ensure that optical detector 97 is always operated at an optimal power operating point. Dectector 97 converts the optical signal into an electrical signal that is demultiplexed in demultiplexer 98. Demultiplexer 98 is the conjugate of multiplexer 81 of transmitter 80.

The link from transmitter 80 to receiver 90 is one direction of a duplex channel. To implement the other direction, wavelength duplexing is used (transmission in one direction is at a wavelength that is different from the transmission in the other direction). This feature enables optical filter 94 to block back scatter form optical transmitter 99. The reverse direction transmission originates at optical transmitter 99. Optical transmitter 99 preferably includes all of the individual elements described as multiplexer 81, laser transmitter 82, optical amplifier 84 and fiber connection 86. The optical output of optical transmitter 99 enters the transmitter port of optical duplexer 92, and from there is propagated to an optical system for collecting light from a regional light source, hereinafter, a telescope 91 for transmission to telescope 88. Optical duplexer 92 may be any device for providing a return channel path as well as a forward channel path merge functionality. An optical duplexer (that corresponds to optical duplexer 92) is coupled between telescope 88 and fiber 86 so that a receive optical signal may be processed in a way that corresponds to the way described with respect to receiver 90.

Figure 3:
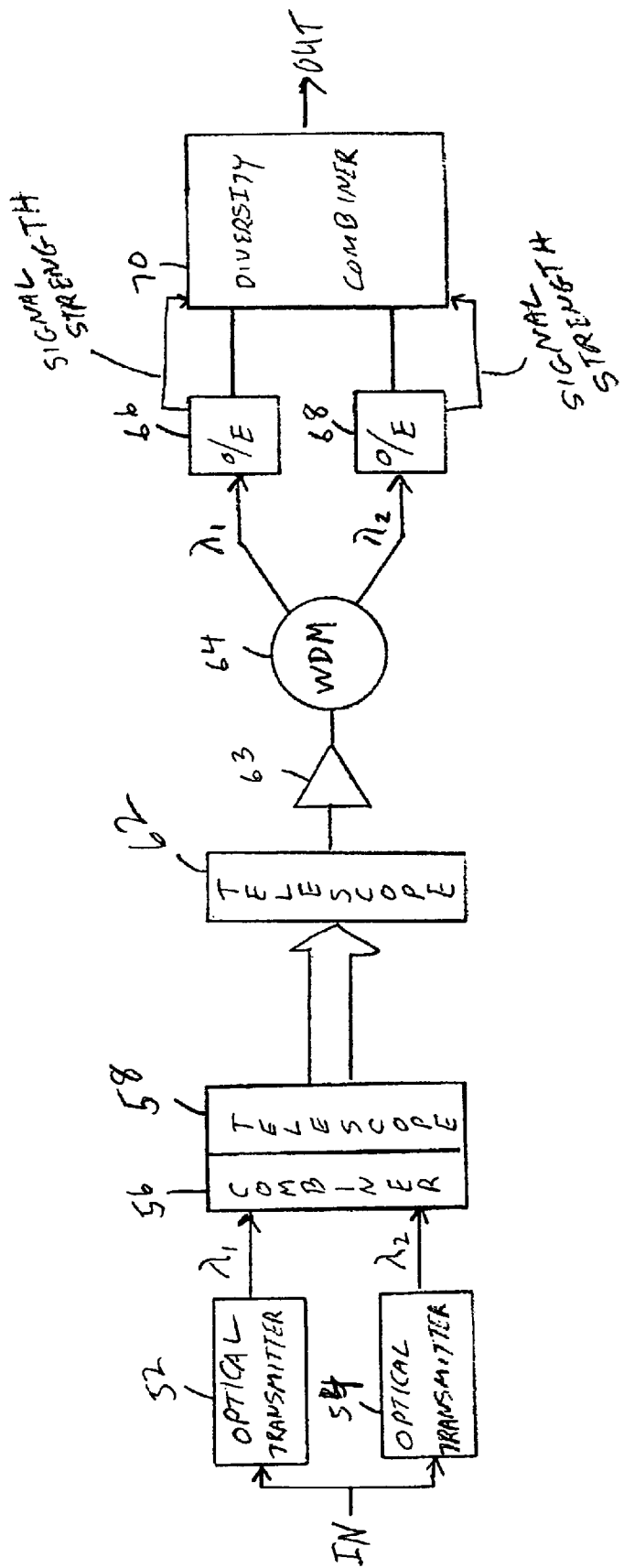
FIG. 3 is a block diagram of a second embodiment of the present invention.

In FIG. 3, a free space optical channel (as in link 30 of FIG. 1) includes transmitter 50 and receiver 60. Transmitter 50 includes first optical transmitter 52 and second optical transmitter 54. The input signal IN is divided to independently and simultaneously excite first and second optical transmitters 52 and 54. Typically, each optical transmitter is a laser diode but may include other high speed modulated electro-optical devices such as light emitting diodes (LEDs). First optical transmitter 52 transmits the input signal carried on wavelength $\lambda 1$, and second optical transmitter 54 transmits the input signal carried on wavelength $\lambda 2$. Transmitter 50 further includes optical combiner 56 and optical telescope 58 to transduce the optical signals from the outputs of first and second optical transmitters 52 and 54 into free space optical beams directed in the direction of receiver 60.

Receiver 60 includes optical telescope 62 to transduce the free space optical beams received from transmitter 50 into an optical signal (typically contained in an optical fiber) that is supplied through optical amplifer 63 (e.g., erbium doped fiber amplifier) to wavelength demultiplexer 64. Wavelength demultiplexer 64 separates wavelength division multiplex optical signals into an optical signal carried on wavelength $\lambda 1$, and an optical signal carried on wavelength $\lambda 2$. The optical signal carried on wavelength $\lambda 1$ is detected in optical-to-electrical converter 66, and the optical signal carried on wavelength $\lambda 2$ is detected in optical-to-electrical converter 68. The optical-to-electrical converters may be, for example, photodiodes, avalanche photodiodes, phototransistors or photogates. The detected outputs of converters 66 and 68 are combined in diversity combiner 70, and the combined signal is output as signal OUT.

The optical transmitter and optics of FIG. 3 includes a dual channel (or plural channel) arrangement that converts the input signal into redundant optical signals at different wavelengths before optically sending two beams (or plural beams) to the receiver. In this way, an optical transceiver optically modulates a signal onto redundant channels at different wavelengths. At the receiver end, the free space signal is converted to an optical signal in a fiber and amplified in optical amplifier 63. Prior art transmission systems do not transmit multiple beams at correspondingly distinct wavelengths while optically amplifying the received signal.

At the receiver, signal levels of the optical signals at wavelengths $\lambda 1$ and $\lambda 2$ are monitored and used to optimally combine the received signals.

Figure 4:
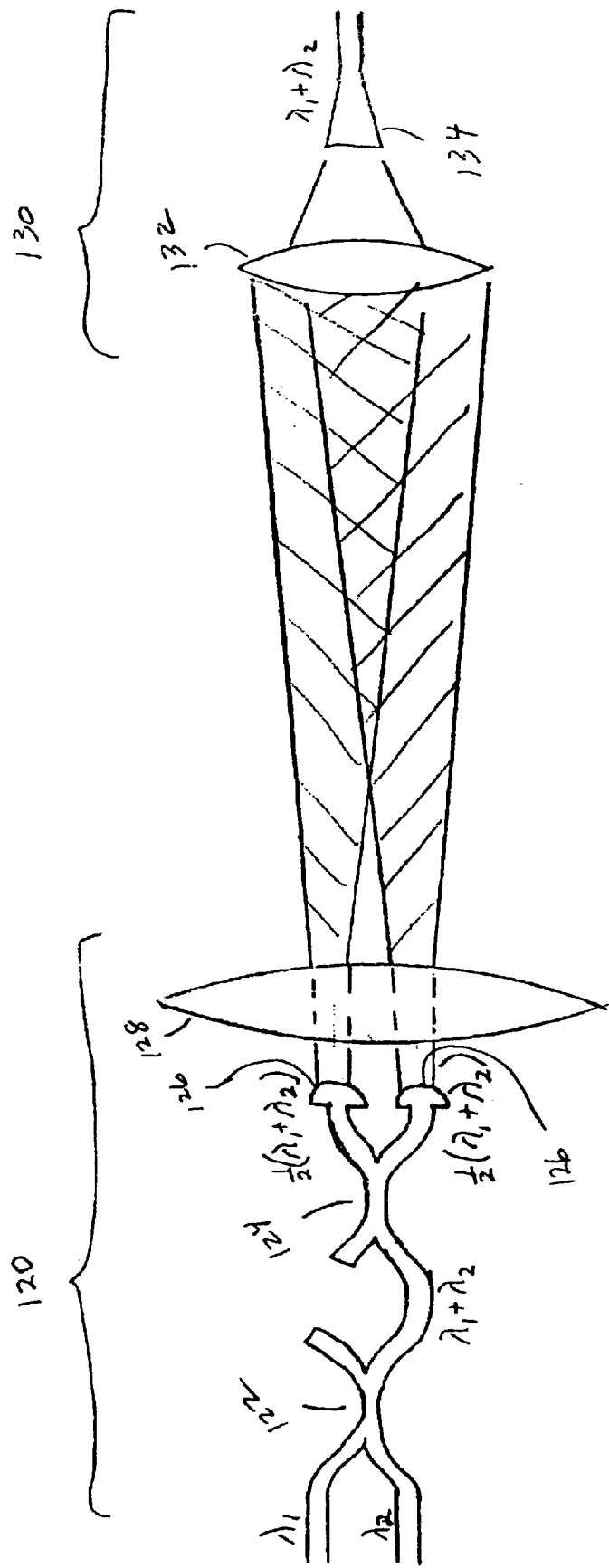
FIG. 4 is a schematic diagram of a telescope according to the present invention.

In FIG. 4, transmit telescope 120 includes two input fibers carrying optical signals at two different wavelengths ($\lambda 1$ and $\lambda 2$). The two optical signals at different wavelengths are combined or summed in a device for combining light channels, such as a biconic taper fiber or combiner or coupler, 122 and the combined signal is divided or split in signal splitter 124, for example, to provide approximately $\frac{1}{2}(\lambda 1+\lambda 2)$ in each path. From each end 126 of the dividing coupler, a multi-wavelength beam is launched and focused by optical system, such as a lens or lens and mirror system, 128 on a distant receiving light collector or telescope 130. Although the transmit telescope collimates the outgoing beams to a desired degree of divergence, there will be some small dispersion of the beam that results in an overlap area. Optical lens 132 of receive telescope 130 is positioned in the overlap area so that lens 132 receives the superimposed beams. Lens 132 focuses the overlapped beams into, for example, a multimode fiber, conical taper, or other device 134 which collects the optical signal as a multimode signal for further processing.

Figure 5:
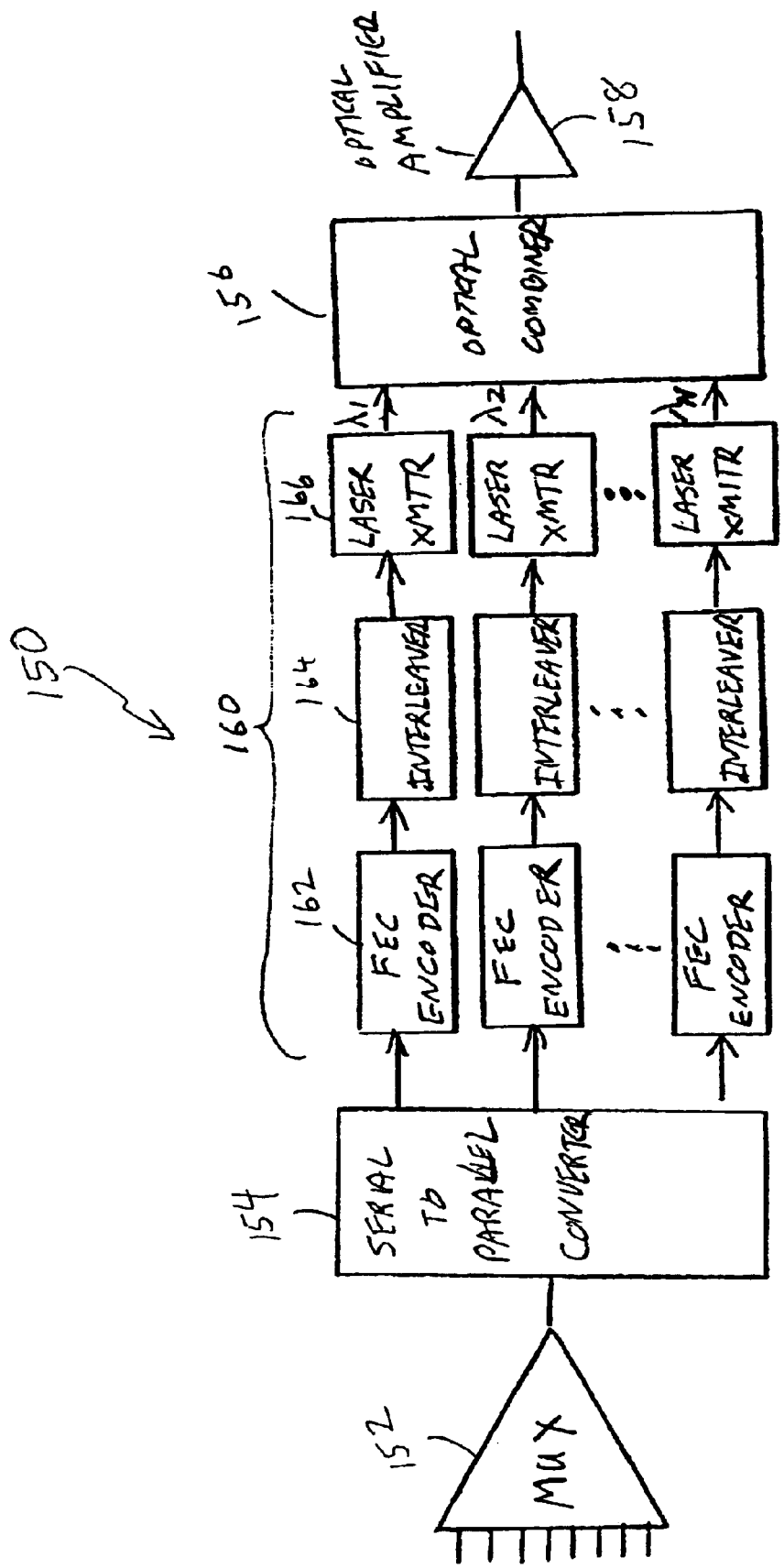
FIG. 5 is a block diagram of an encoder section of a transmitter according to the present invention.

The laser transmitter of FIG. 2 or 3 may be replaced with a wavelength division transmitter of FIG. 5. In FIG. 5, the transmitter includes encoding section 150. Encoding section 150 includes multiplexer 152 to multiplex together plural diverse input signals and provide a serial bitstream at its output. Then, in serial to parallel converter 154 the serial bitstream is converted into plural parallel signals (a predefined number of signals) to be processed. Each parallel signal is process in parallel section 160 that includes forward error correction encoder 162 (an FEC encoder or other redundancy error correction encoder), bit interleaver 164 and a laser transmitter 166 (e.g., a laser diode or other laser source). For example, an output of FEC encoder 162 might be a signal organized in a block made of 8 bytes with each byte having 8 bits. Interleaver 164 might take the first bit of each byte before taking the second bit of each byte. In this way, errors are spread out over the time it takes to transmit the block in order to "whiten" the effect of an error and make it easier for a FEC code to correct for the error. Each interleaved signal is then converted into an optical signal on a distinct, predefined wavelength and the optical signals are combined in optical combiner 156 (e.g., coupler 122 of FIG. 4), and the combined signal is amplified in optical amplifier 158 (e.g., an erbium doped fiber amplifier, EDFA) before being sent to a transmitter telescope (see FIG. 2 or 3). Prior art does not use this arrangement for an optical transmitter, and thus is unable to tolerate deep fades (>30 dB) that last for tens of milliseconds.

Having described preferred embodiments of a novel free space optical communications link (which are intended to be illustrative and not limiting), it is noted that modifications and variations can be made by persons skilled in the art in light of the above teachings. For example, various techniques of sending redundancy information and redistributing information over the time slot for a block of data may be combined to whiten and limit the effects of fading. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A terminal in a free-space wavelength duplexed system comprising:

a telescope having an equipment end and a free-space end that is adapted to carry free-space, wavelength duplexed, communication;

an optical splitter having a first port connected said equipment end of said telescope;

an optical transmitter for generating an optical signal at a first wavelength, coupled to a second port of said optical splitter; and an optical receiver coupled to a third port of said optical splitter having an optical-to-electrical converter and an optical amplifier coupled between said optical splitter and the optical-to-electrical converter.

2. The system of claim 1, wherein the optical receiver further includes a filter, preceding said optical-to-electrical converter for passing an optical signal of a second wavelength that is different from said first wavelength.

3. A free-space communication system comprising at least two terminals as defined in claim 1, characterized in that, the free-space ends of said two terminals exchange optical signals via free space.

4. The terminal of claim 1, wherein:
   the optical transmitter includes
      plural lasers sources, each laser source modulating an input signal onto a wavelength that is distinct from a wavelength of each other laser source to form a plurality of different-wavelength optical signals; and
      an element that combines said plurality of different-wavelength optical signals and applies result the combined plurality of different-wavelength optical signals to said optical splitter; and
   the optical receiver includes a WDM demultiplexer preceding said optical-to-electrical converter.

5. The terminal of claim 1, wherein:
   the optical transmitter includes plural lasers sources, each laser source modulating an input signal onto a wavelength that is distinct from a wavelength of each other laser source; and
   the telescope includes a first part to combine the output of the plural laser sources into a multi-wavelength beam and a second part to optically separate the multi-wavelength beam into plural co-parallel and spaced apart beams, the telescope projecting the plural co-parallel and spaced apart beams toward the second terminal.

6. The system of claim 3, wherein the optical transmitter of a first terminal of said two terminals includes:
   an electrical converter to convert a serial bitstream into plural parallel blocks of data;
   an FEC encoder, bit interleaver and laser source for each parallel block of data, each laser source modulating the interleaved FEC encoded parallel block of data on a wavelength distinct from a wavelength of each other laser source; and
   an optical combiner to combine an optical signal from each laser source.

7. The system of claim 6, wherein the optical transmitter further includes a multiplexer to combine plural input signals into the serial bitstream.

8. The free space system of claim 6, wherein the telescope of said first terminal projects an output of the combiner toward a second terminal of said two terminals.

9. The terminal of claim 5 where said second part optically separates the multi-wavelength beam into plural co-parallel and spaced apart beams, with each carrying the same signal.

10. The terminal of claim 4 where at least some of the input signals that are modulated signals up to said distinct wavelengths are derived from a given input signal in accord with a diversity technique.

11. The terminal of claim 4 where said result that is developed by said element that combines comprises said different-wavelength signals that point to substantially a common target, but are spatially separated by each other so as to traverse a different free-space path.

* * * * *